US012802057B2

(12) United States Patent
Ulrich et al.

(10) Patent No.: US 12,802,057 B2
(45) **Date of Patent: *Nov. 17, 2026**

(54) CONDUCTING A TRANSACTION AT A MOBILE POS TERMINAL USING A DEFINED STRUCTURE

(71) Applicant: Worldpay, LLC, Symmes Township, OH (US)

(72) Inventors: Chance Ulrich, Milton, GA (US); Scot A. Bryant, Chandler, AZ (US)

(73) Assignee: Worldpay, LLC, Symmes Township, OH (US)

( * ) Notice: Subject to any disclaimer, the term of this patent is extended or adjusted under 35 U.S.C. 154(b) by 91 days.

This patent is subject to a terminal disclaimer.

(21) Appl. No.: 18/812,511

(22) Filed: Aug. 22, 2024

(65) Prior Publication Data

US 2024/0412192 A1 Dec. 12, 2024

Related U.S. Application Data

(63) Continuation of application No. 18/337,539, filed on Jun. 20, 2023, now Pat. No. 12,086,785, which is a (Continued)

(51) Int. Cl.
*G06Q 10/00* (2026.01)
*G06F 3/048* (2013.01)
(Continued)

(52) U.S. Cl.
CPC ....... *G06Q 20/322* (2013.01); *G06Q 20/3276* (2013.01); *G06Q 20/34* (2013.01); *G06Q 20/4012* (2013.01); *G06Q 20/40145* (2013.01)

(58) Field of Classification Search
CPC .. G06Q 20/322; G06Q 20/3276; G06Q 20/34; G06Q 20/4012; G06Q 20/40145
See application file for complete search history.

(56) References Cited

U.S. PATENT DOCUMENTS 8,321,345 B2 * 11/2012 Makhotin .............. G06Q 20/20 705/64
11,227,276 B2 * 1/2022 Ulrich .................. G06Q 20/322
(Continued)

FOREIGN PATENT DOCUMENTS

CN 101859458 A 10/2010
EP 2230605 A1 9/2010
GB 2478702 A 9/2011

OTHER PUBLICATIONS

"BIP-1500 Series Rugged All-in-one Handheld Computer", Feb. 28, 2012. www.sdgsystems.com/download/datasheets/BIP-1500_Datasheet.pdf.
(Continued)

*Primary Examiner* — Talia F Crawley
(74) *Attorney, Agent, or Firm* — Bookoff McAndrews, PLLC

(57) ABSTRACT

A system and method configured for conducting a transaction between two parties using a mobile device, or a plurality of mobile devices. In various embodiments, a system for conducting a transaction can comprise an accessory device having an accessory device module and a hardware component, where the accessory device can have various accessory device capabilities. The system can further comprise a mobile device SDK incorporated into the client application and in communication with the accessory device, where the mobile device SDK includes an accessory conversion module in communication with the accessory device module and where the mobile device SDK provides data to the client application. The client application can request accessory device information and receive accessory device capabilities, and the transaction data for the transaction can be provided in a defined structure between the accessory device and the client application via the mobile device SDK.

20 Claims, 10 Drawing Sheets

100

Related U.S. Application Data continuation of application No. 17/457,935, filed on Dec. 7, 2021, now Pat. No. 11,720,877, which is a continuation of application No. 16/718,876, filed on Dec. 18, 2019, now Pat. No. 11,227,276, which is a continuation of application No. 16/230,126, filed on Dec. 21, 2018, now Pat. No. 10,546,288, which is a continuation of application No. 13/838,057, filed on Mar. 15, 2013, now Pat. No. 10,204,331.

(51) Int. Cl.

| | |
|---|---|
| ***G06Q 20/32*** | (2012.01) |
| ***G09G 5/00*** | (2006.01) |
| *G06Q 20/34* | (2012.01) |
| *G06Q 20/40* | (2012.01) |

(56) References Cited

U.S. PATENT DOCUMENTS

2004/0104268 A1* 6/2004 Bailey ................ G06Q 20/3223 235/439
2006/0160570 A1* 7/2006 Kamarainen ....... H04L 65/1059 455/557
2007/0080934 A1* 4/2007 Chen ...................... G08C 17/02 345/156
2008/0040139 A1* 2/2008 Pousti .................. G06Q 20/322 705/40
2008/0052363 A1* 2/2008 Pousti ..................... H04L 12/14 709/206
2008/0287095 A1* 11/2008 Pousti .................. G06Q 20/102 455/406
2011/0093326 A1* 4/2011 Bous ...................... G06Q 30/02 705/14.38
2011/0231272 A1* 9/2011 Englund .............. G07G 1/0081 705/21
2011/0313871 A1* 12/2011 Greenwood ........... G06Q 20/10 705/16
2012/0023024 A1* 1/2012 Evans ................ G06Q 20/3672 705/41
2012/0066079 A1* 3/2012 Falzone .................... G07F 7/08 705/16
2012/0109818 A1* 5/2012 Carlson ................ G06Q 20/363 705/39
2012/0123935 A1* 5/2012 Brudnicki .......... G06Q 30/0601 705/41
2012/0143706 A1* 6/2012 Crake ................ G06Q 20/3227 705/18
2012/0214416 A1* 8/2012 Kent ..................... H04W 4/021 455/41.2
2012/0270528 A1* 10/2012 Goodman .............. G06Q 20/36 455/418
2012/0284130 A1* 11/2012 Lewis .................... G06Q 40/00 705/16
2012/0290421 A1* 11/2012 Qawami ................. G06F 21/31 705/21
2012/0290468 A1* 11/2012 Benco ................ G06Q 20/3224 705/39
2012/0303425 A1* 11/2012 Katzin ............... G06Q 20/4016 705/16
2012/0303520 A1* 11/2012 Huang ................... A45C 11/00 361/679.01
2013/0031485 A1* 1/2013 Chen ..................... G06F 16/972 715/748
2013/0231160 A1* 9/2013 Rao ....................... G06F 16/951 455/563
2014/0173692 A1* 6/2014 Srinivasan ............ H04W 12/02 726/4

OTHER PUBLICATIONS

"Mobile. Money. Now". More Magic: An Oberthur Technologies Company. http://www.moremagic.com; accessed Dec. 14, 2012.
Leong, C.Y. et al., "Near Field Communication and Bluetooth Bridge System for Mobile Commerce". IEEE International Conference on Industrial Informatics, pp. 50-55 (Aug. 16, 2006).
PCT; International Search Report and Written Opinion dated Jul. 7, 2014 in Application No. PCT/US2014/021644.

* cited by examiner

300

CONDUCTING A TRANSACTION AT A MOBILE POS TERMINAL USING A DEFINED STRUCTURE

CROSS-REFERENCE TO RELATED APPLICATION(S)

This patent application is a continuation of and claims the benefit of priority to U.S. application Ser. No. 18/337,539, filed on Jun. 20, 2023, which is a continuation of and claims the benefit of priority to U.S. application Ser. No. 17/457,935, filed on Dec. 7, 2021, now U.S. Pat. No. 11,720,877, which is a continuation of and claims the benefit of priority to U.S. application Ser. No. 16/718,876, filed on Dec. 18, 2019, now U.S. Pat. No. 11,227,276, which is a continuation of and claims the benefit of priority to U.S. application Ser. No. 16/230,126, filed on Dec. 21, 2018, now U.S. U.S. Pat. No. 10,546,288, which is a continuation of and claims the benefit of priority to Ser. No. 13/838,057, filed on Mar. 15, 2013, now U.S. Pat. No. 10,204,331, the entirety of which are incorporated herein by reference.

FIELD OF THE DISCLOSURE

The present disclosure relates to the field of transaction processing between an application and an accessory device, and in particular, relates to the transaction processing being facilitated by a mobile device application.

BACKGROUND ART

Mobile devices such as smartphones and tablets are becoming more capable of various functions based on the development of hardware, software, and accessories. One such capability is the processing of a transaction between a customer and a merchant using a mobile device. Typically, a merchant uses a mobile device and an accessory device to read information from a customer's account card and then process the transaction through a third party authorization entity. To enable transaction processing using the mobile device, a merchant will typically download software to the mobile device that is configured to communicate with the accessory device. Each accessory device may have different capabilities and different processing protocols for providing data to the mobile device. Due to the differences between accessories, a merchant would need to download different individual software for each accessory device.

Furthermore, the download software may be provided to the merchant by the third party authorization entity, resulting in the third party authorization entity providing several different software versions in order to be compatible with different accessory devices. In addition, each upgrade or change to an accessory device may require an update to the merchant's software or third party authorization entity's software in order to remain compatible. This results in constant monitoring and software updates by the merchant and the third party authorization entity. Moreover, if the third party authorization entity has transaction processing compatibility limited to a few type of accessory devices, then a merchant is equally limited in selection of an accessory device for use.

Thus, a need exists for enabling a third party authorization entity and/or merchant's transaction platform to be compatible with multiple different accessory devices and to do so using software that is not subject to potential changes in an accessory device.

SUMMARY

The present disclosure provides a method, computer-readable medium and system for conducting a transaction between two parties using a mobile device, or a plurality of mobile devices. In various embodiments, a system for conducting a transaction can comprise an accessory device, connected to a mobile device, comprising an accessory device module and a hardware component, wherein the accessory device can have various accessory device capabilities. The system can further comprise a client application, installed on the mobile device, incorporating a mobile device software development kit (SDK), wherein the mobile device SDK comprises an accessory conversion module in communication with the accessory device module and wherein the mobile device SDK is configured to provide data to the client application. The client application can request accessory device information and receives accessory device capabilities. The mobile device SDK can receive, from the accessory device module, transaction data in an accessory device format, and the accessory conversion module converts the transaction data from the accessory device format into a defined structure; and where the mobile device SDK provides, to the client application, the transaction data in the defined structure.

In various embodiments, a mobile device SDK can comprise an accessory conversion module for communicating with an accessory device module of an accessory device. The mobile device SDK receives transaction data for a transaction in an accessory device format, converts the transaction data from the accessory device format into a defined structure; and provides, to the client application, the transaction data in the defined structure. Also, the mobile device SDK communicates transaction data for a transaction between the client application and the accessory device.

The transaction can occur in accordance with various methods, for example, conducting a transaction by receiving, by a mobile device SDK, a request for accessory device information from a client application; retrieving accessory device capabilities from an accessory device; providing the accessory device capabilities to the client application; receiving transaction data in an accessory format from the accessory device; converting, by an accessory conversion module of the mobile device SDK, the transaction data from the accessory device format to a defined structure; providing the transaction data in the defined structure to the client application. In various embodiments, the transaction can be a financial transaction or a non-financial transaction.

The present disclosure further includes computer program product of a computer-readable medium usable with a programmable computer and having computer-readable code embodied therein for conducting a transaction between a merchant and a customer.

DETAILED DESCRIPTION

Figure 1:
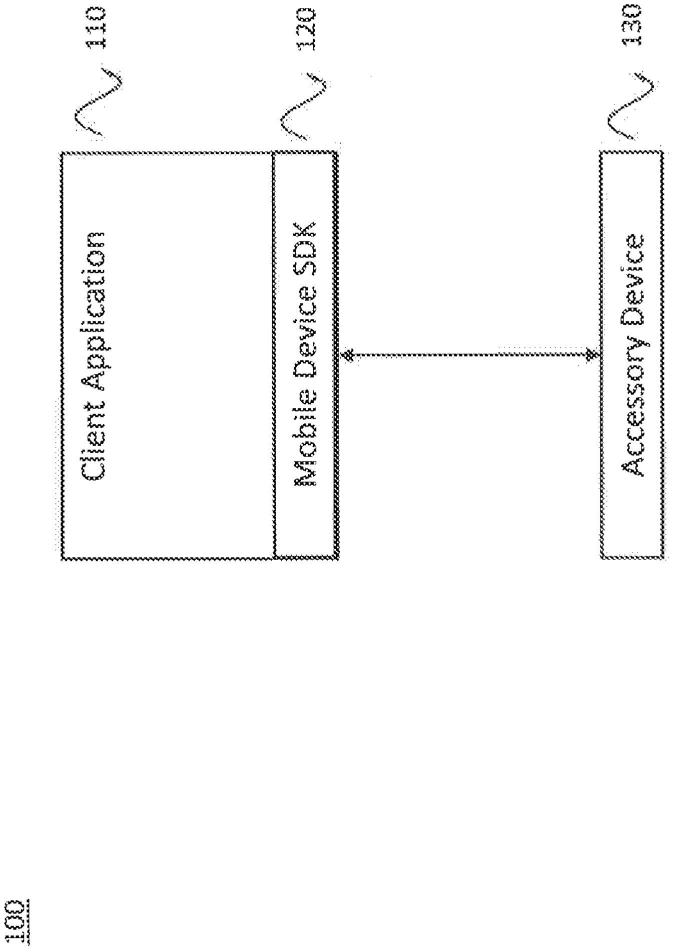
FIG. 1 illustrates a block diagram of a mobile transaction system, in accordance with various embodiments.

Various embodiments presented herein relate to conducting a transaction between parties using a mobile device. The parties can be a merchant and a customer, an operator of a mobile device and a user, or a mobile device user and a user providing information to an accessory device. The detailed description of exemplary embodiments herein makes reference to the accompanying drawings and figures, which show the exemplary embodiments by way of illustration only. While these exemplary embodiments are described in sufficient detail to enable those skilled in the art to practice the present disclosure, it should be understood that other embodiments may be realized and that logical and mechanical changes may be made without departing from the spirit and scope of the present disclosure. It will be apparent to a person skilled in the pertinent art that this disclosure can also be employed in a variety of other applications. Thus, the detailed description herein is presented for purposes of illustration only and not of limitation. For example, the steps recited in any of the method or process descriptions may be executed in any order and are not limited to the order presented.

The present disclosure is described herein with reference to system architecture, block diagrams and flowchart illustrations of methods, and computer program products according to various aspects of the present disclosure. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The present disclosure is now described in terms of an exemplary system in which the present disclosure, in various embodiments, would be implemented. This is for convenience only and is not intended to limit the application of the present disclosure. It will be apparent to one skilled in the relevant art(s) how to implement the present disclosure in alternative embodiments.

In accordance with various embodiments and with reference to FIG. 1, a mobile transaction system 100 can comprise a client application 110 incorporating a mobile device SDK 120, and an accessory device 130 in communication with mobile device SDK 120. In various embodiments, a mobile device transaction can occur by a transaction device being presented to accessory device 130. The transaction can be a financial transaction or a non-financial transaction. Furthermore, in various embodiments, the transaction can be communication of information between two parties, and is not necessarily limited to an exchange of goods or services for compensation. Accessory device 130 can receive consumer transaction information from the transaction device. The mobile device SDK 120 can send the consumer transaction information, along with merchant transaction information, to client application 110 to process the transaction. Mobile transaction system 100 has various advantageous over a traditional point-of-sale system, namely mobility and cost of infrastructure. Furthermore, mobile device SDK 120 acts as a middleman for communications between client application 110 and accessory device 130, thereby providing flexibility and adaptability for mobile device SDK 120 to address any change made to accessory device 130 or client application 110.

Figure 2:
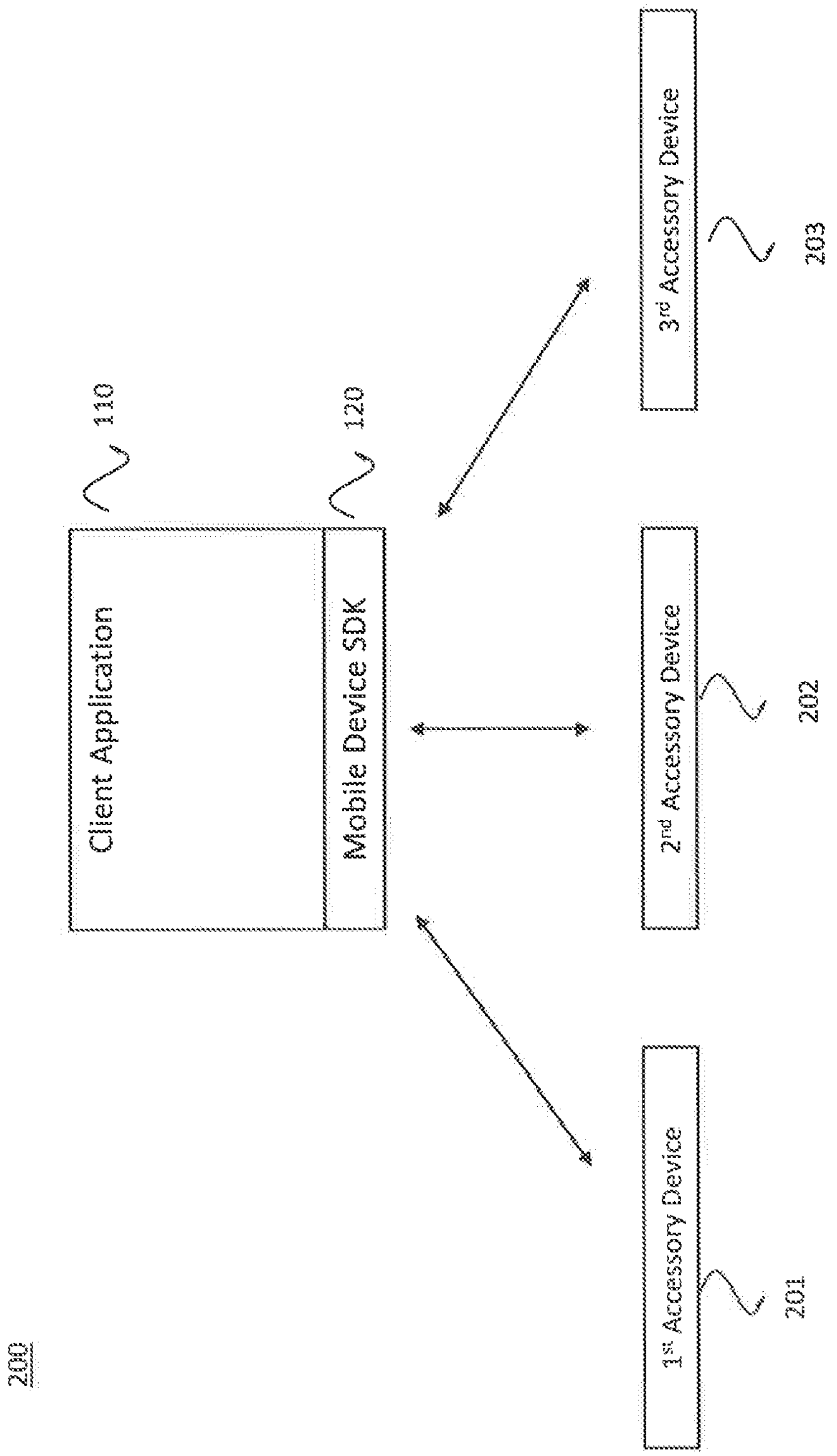
FIG. 2 illustrates a block diagram of a mobile transaction system with multiple accessory devices, in accordance with various embodiments.

Furthermore, a mobile device SDK can be configured for communicating with multiple accessory devices. In various embodiments and with reference to FIG. 2, a mobile transaction system 200 can comprise client application 110 incorporating mobile device SDK. 120, similar to the disclosure of mobile transaction system 100. However, mobile transaction system 200 can further comprise mobile device SDK 120 configured for communicating with multiple accessory devices, such as first accessory device 201, second accessory device 202, and/or third accessory device 203. Multiple accessory devices can be connected to the mobile device SDK concurrently.

Client application 110 can be an application provided by a merchant, a business management software provider, a transaction processing entity, a card issuer, a third party authorization entity, a payment processor, an account issuer, a card authorizer, and the like. In various embodiments, client application 110 can be developed using mobile device SDK 120. The client application 110 can be built with the mobile device SDK binaries. Client application 110 along with the mobile device SDK binaries can be installed on a mobile device (not shown). The mobile device can be a smart phone, tablet computer, notebook computer, or any other device that is compatible with an accessory device to form a mobile point-of-sale terminal. Client application 110 can be configured to communicate information to facilitate a transaction. For example, client application 110 can be a shell for an external application, such as an internet application.

Accessory device 130 can be a mobile point-of-sale component that includes an accessory device SDK and connection hardware. The accessory device may also be referred to as a point-of-entry device. Each accessory device has certain device capabilities. In various embodiments, accessory device 130 can comprise at least one of a magnetic stripe reader, a bar code reader, a pin pad, and a biometric reader. In various embodiments, accessory device 130 can retrieve information from a customer, a transaction card, a radio frequency (RF) device, or other transaction device. For example, information may be provided to accessory device 130 by entering a PIN, swiping a transaction card, waving an RF device or the like. The accessory device SDK can convert the received information into a predetermined or preselected format/protocol for communicating to mobile device SDK 120. The predetermined or preselected format/protocol may often be proprietary to the accessory device 130. In various embodiments, the transaction device can be a financial card or a non-financial card, such as a loyalty card, rewards card, a gift card, a driver's license, or any other device that can be used to identify a consumer and/or a consumer account.

Conducting a Transaction

Figure 3:
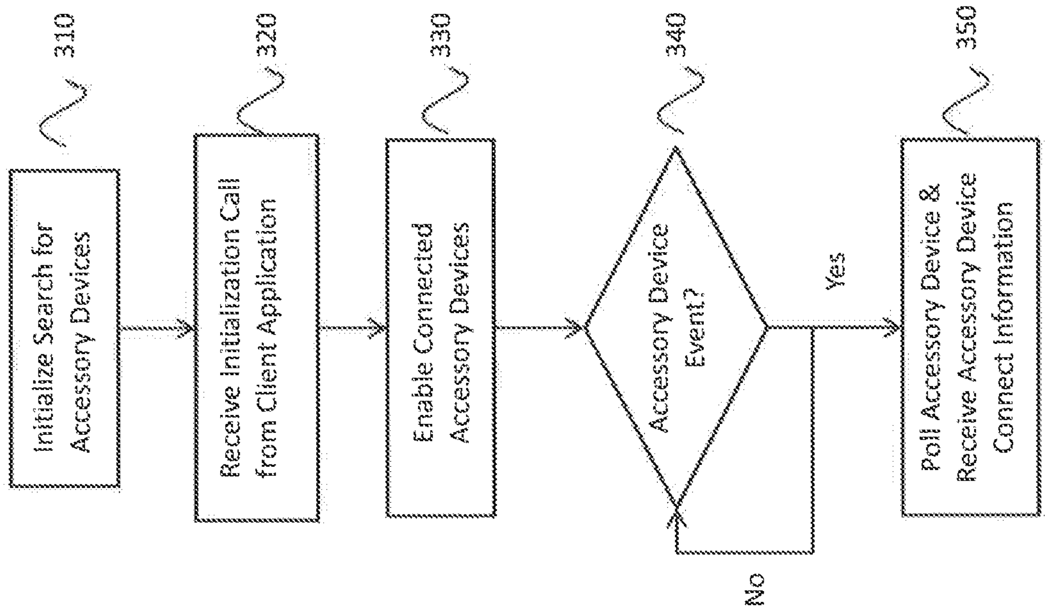
FIG. 3 illustrates a method for connecting to an accessory device, in accordance with various embodiments.
Figure 4:
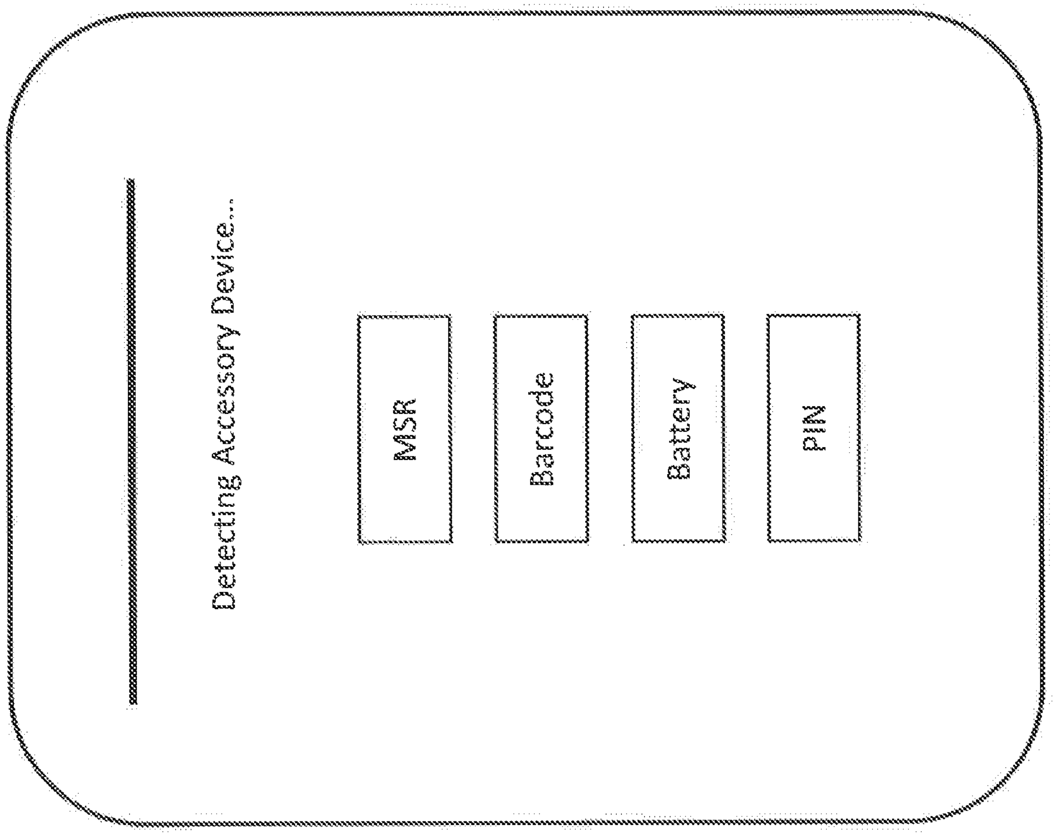
FIG. 4 illustrates an exemplary screen shot of different options related to accessory device detection as displayed on a mobile device, in accordance with various embodiments.

An initial step in conducting a transaction using at a mobile point-of-sale (POS) can be detecting if an accessory device is connected to a mobile device. In various embodiments and with reference to FIG. 3, a method 300 of detecting an accessory device can comprise initializing, by a client application, a search for connected accessory devices 310, and receiving, by a mobile device SDK, an initialization call from the client application 320. The mobile device SDK can provide enabling instructions to all connected accessory devices 330. Further, the mobile device SDK can wait for an accessory device event 340. In response to an accessory device event occurring, the mobile device SDK can poll for accessory device connections and receive accessory device connect information 350. FIG. 4 illustrates various options that may be enabled for selection in response to the accessory device being detected. For example, a user may select a magnetic stripe reader (MSR), a barcode reader, battery information for the detected accessory device, and/or a PIN pad.

Merchant data can also be collected as part of the transaction. As used herein, merchant data can include information related to the product or service subject to the transaction, a transaction price, and merchant identification information. In various embodiments, the merchant data can be provided from different sources. For example, at least part of the merchant data, such as quantity and price, can be manually entered into the client application or the mobile device application. In another example, either the mobile device or the accessory device can include a bar code scanner, which can be used to scan a barcode for the subject service or good, or a customer identification bar code. The bar code can be used to retrieve information related to the service or good for the transaction. In addition, another example can include the merchant data being supplied from an application on the mobile device. The supplied merchant information can include pricing information, as well as merchant identifying information.

Figure 5:
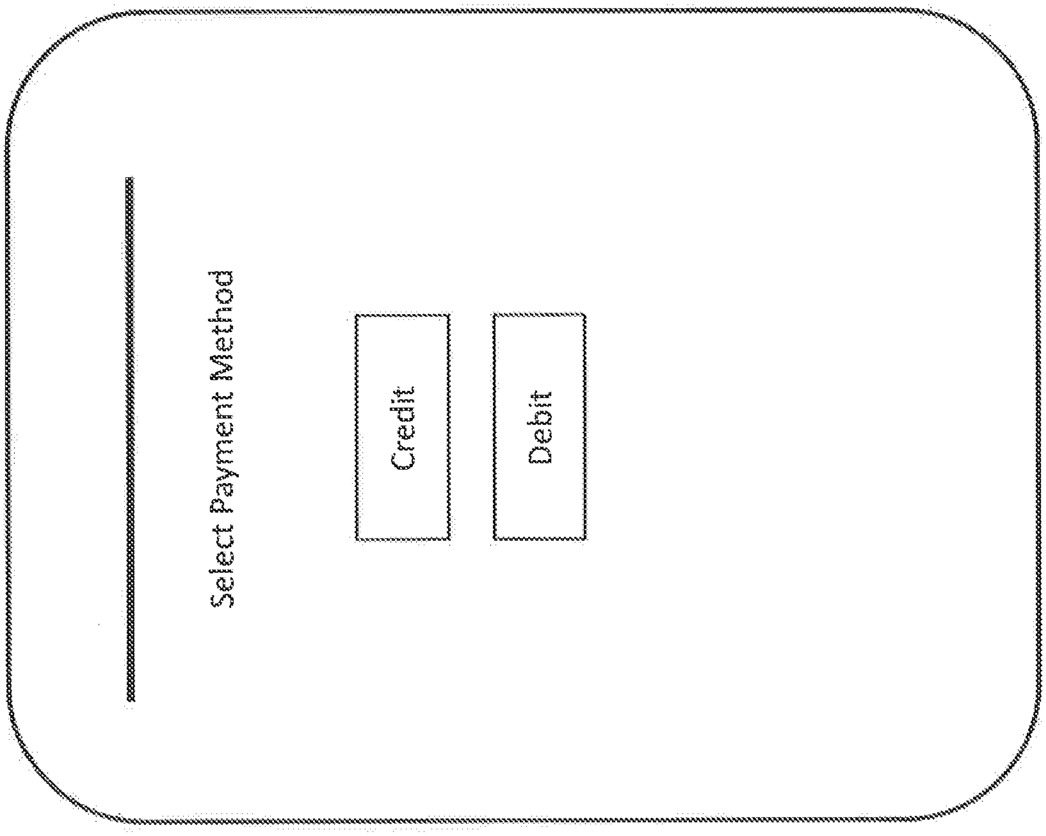
FIG. 5 illustrates an exemplary screen shot of a payment method selection displayed on a mobile device, in accordance with various embodiments.

In various embodiments, the method of payment can also be selected. FIG. 5 illustrates an exemplary mobile device screenshot where payment method options are presented for selection. The different methods can have different processing protocols and information associated. Two examples of payment methods from debit transactions and credit transactions are illustrated. However, transactions can be facilitated using other methods which can be provided for selection, such as reward points, loyalty points, gift cards, and the like. In various embodiments, a debit transaction can include two authentication steps, namely swiping a debit card and inputting a personal identification number (PIN) into a pin pad. Similarly, in various embodiments, a credit transaction can include swiping a credit card. A credit transaction could also include capturing a signature for additional authentication. In various embodiments, selecting the method of payment can occur before or after merchant data is collected.

As previously mentioned an accessory device has certain device capabilities. In accordance with various embodiments, device capability can be information related to the functions and types of readers of the accessory device. For example, accessory device capabilities can include a magnetic stripe reader, a PIN pad, a radio frequency identification reader, an integrated circuit reader, and the like. In one embodiment, the accessory device SDK provides the device capabilities to the mobile device SDK. In another embodiment, the mobile device SDK can retrieve accessory device capabilities from a lookup table based on identification of the accessory device type. The lookup table can be part of the mobile device SDK and located on the mobile device. The lookup table can also be remotely located and accessed by the mobile device SDK.

Furthermore, in various embodiments, the mobile device SDK can provide the device capabilities to the client application. The mobile device SDK can provide all the device capabilities or only a subset of all the device capabilities to the client application. In various embodiments, the mobile device SDK can provide a subset of device capabilities to the client application, where the subset is selected based on communication restrictions, mobile device limitations, and the like. Providing only a subset of device capabilities may be desired if the mobile device or mobile device SDK has limitations that are not compatible with certain accessory device capabilities. Further, limiting the provided device capabilities may also be desired if the rate of data transfer is low and certain device capabilities need a higher data transfer rate.

The retrieval of accessory device capabilities can be followed by enabling one or more of the device capabilities. In various embodiments, the determination of which accessory device capabilities to enable can be made from either the client application or the mobile device SDK. The mobile device SDK can enable one or more selected accessory device capabilities in response to the enablement determination. Further, in various embodiments, mobile device SDK can monitor the accessory device for accessary device events.

In accordance with various embodiments, an accessory device event occurs in response to a transaction card being swiped, a bar code being read, or any type of account information transfer to the accessory device to facilitate a transaction. The accessory device reads the account information provided by a customer, transaction card, or other transaction device. The type of data and/or the data format of the account information can vary depending on the accessory device, and more specifically the data format can be set by the accessory device SDK in an accessory device format. The accessory device format may be proprietary to the accessory device.

Figure 6:
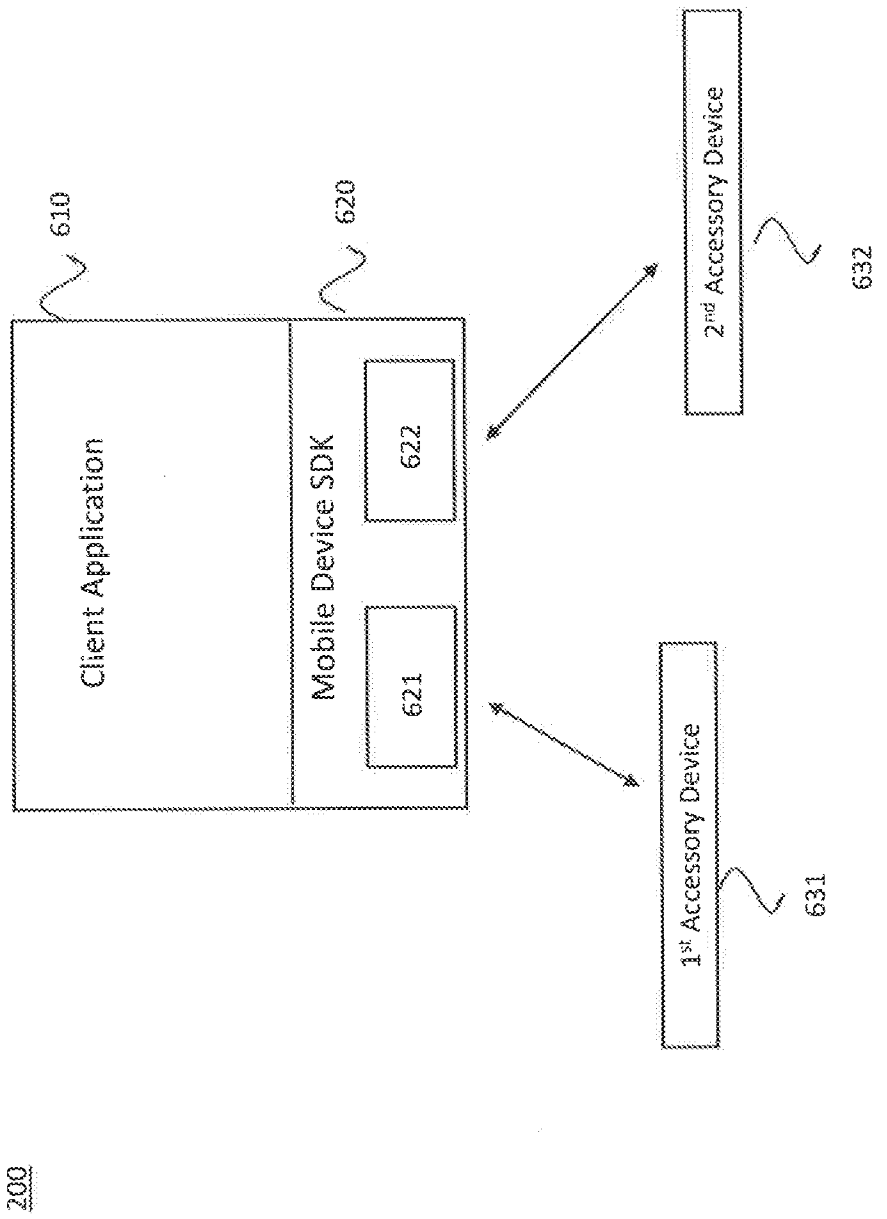
FIG. 6 illustrates a block diagram of another mobile transaction system with multiple accessory devices, in accordance with various embodiments.

The account information can be communicated in the accessory device format to the mobile device SDK. In accordance with various embodiments and with reference to FIG. 6, a mobile device SDK 620 receives account information from either a first accessory device 631 in a first accessory device format, or a second accessory device 632 in a second accessory device format. The mobile device SDK 620 can convert the account information into a defined structure for providing to a client application 610. In accordance with various embodiments, the defined structure can be any predetermined and/or preselected structure of data that is known by the client application. The term "defined" in connection with such structure should be understand broadly to mean any data structure with known data fields. The defined structure can change or be revised as long as documentation is communicated to the client application so that a client application developer may integrate accordingly. In various embodiments, mobile device SDK 620 can further comprise a first accessory conversion module 621 and a second accessory conversion module 622. First accessory conversion module 621 can be configured to convert the account information from the first accessory device format to the defined structure. Similarly, second accessory conversion module 622 can be configured to convert the account information from the second accessory device format to the defined structure. In accordance with various embodiments, regardless of which accessory device 631, 632 is used in the transaction, client application 610 will receive the account information in the known and/or readily recognized defined structure. This defined structure enables client application 610 to process a transaction and be buffered from software or format changes that can occur in the accessory device SDK of accessory devices 631, 632. Moreover, in various embodiments, client application 610 can approve or disapprove of the transaction according to business as usual procedures. The client application 610 can display, or otherwise indicate, to a user the status of the transaction approval process.

In accordance with various embodiments, a method of converting the account information into a defined structure can comprise receiving the account information from the accessory device SDK, parsing the account information into multiple data variables, and composing the account information variables into the defined structure. The mobile device SDK can be configured to handle both encrypted and non-encrypted account information. If the account information is encrypted, certain parts of the account information are masked. For example, the encrypted account information from a transaction device can include account number and discretionary data. The masking can be done differently by different accessory device manufacturers, but the track data can still maintain its basic format. In various embodiments, the mobile device SDK receives card data, parses the track data in to its components based on ISO 7813 (account number, expiration date, etc.).

In accordance with various embodiments, mobile device SDK can produce parsed output in a single structure per accessory type. For example, data from a barcode scanner can be parsed into a barcode structure, and data from a card reader can be parsed into a card reader structure. In various embodiments, the accessory structure may have the fields only partially populated if the specific accessory device being used does not provide data to all the fields. The remaining fields can be empty or null. For example, a non-encrypted accessory device can result in an accessory structure with empty fields relating to encrypted data. Additionally, in various embodiments, mobile device SDK can also be configured to provide raw output data from an accessory device to the client application. The raw output data can be provided in response to the client application requesting more information than is available in the parsed structures.

Figure 7A:
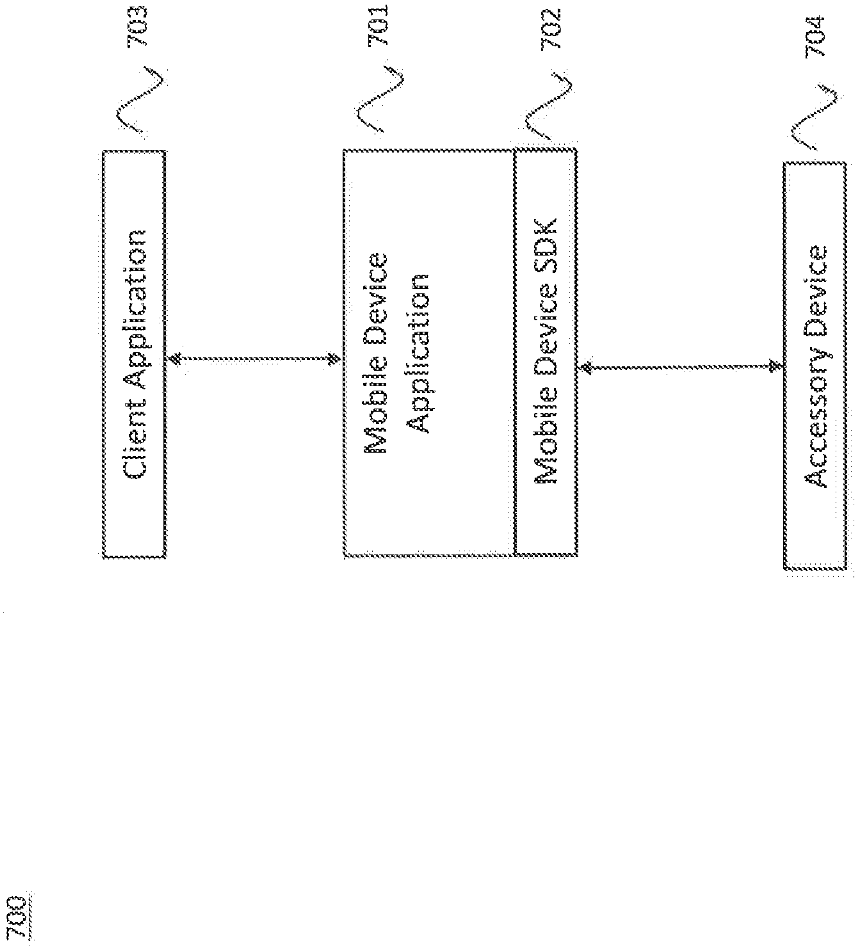
FIG. 7A illustrates a block diagram of a mobile transaction system, in accordance with various embodiments.

Alternatively, in various embodiments and with reference to FIG. 7A, a mobile transaction system 700 can comprise a mobile device application 701 incorporating a mobile device SDK 702, an accessory device 704 in communication with mobile device application 701, and a client application 703 in communication with mobile device application 701. Client application 151 can be remotely located from a mobile device (not shown) having mobile device application 701 installed. Client application 703 can communicate with mobile device application 701 built with mobile device SDK 702 over the internet, phone lines, radio frequency, and cellular network. The connection can be wired or wireless to the mobile device application 701. In accordance with various embodiments, client application 703 can receive, from mobile device application 701, information pertaining to a transaction, including both merchant information and customer information. Moreover, in various embodiments, the information communicated between client application 703 and mobile device application 701 can be communicated with point-to-point encryption.

Figure 7B:
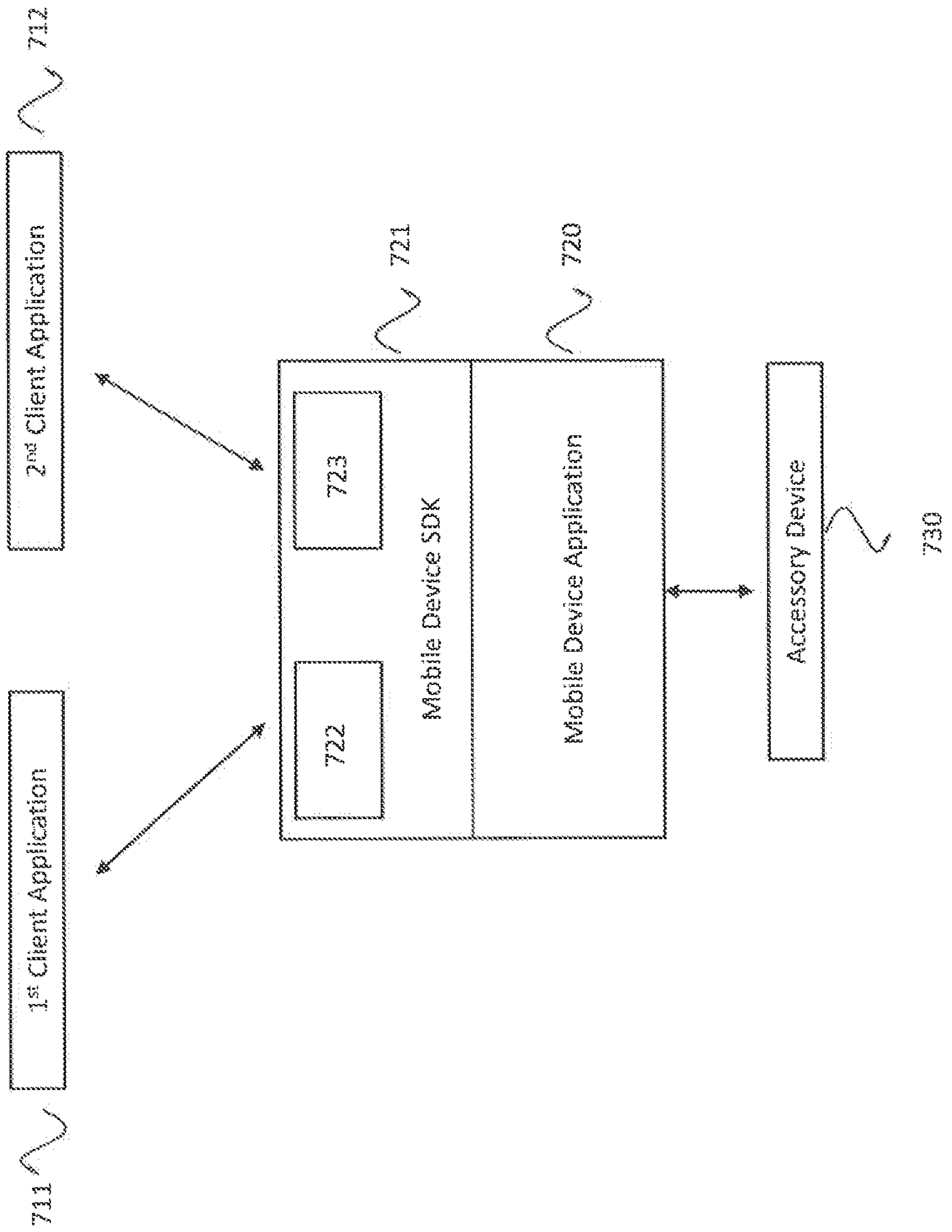
FIG. 7B illustrates a block diagram of a mobile transaction system with multiple client applications, in accordance with various embodiments.

In various embodiments and with reference to FIG. 7B, a mobile device application 720, incorporating a mobile device SDK 721, can be capable of producing multiple "defined" mobile device structures, depending on client application needs. The mobile device application 720 can be in communication with a first client application 711. Mobile device application 720 can also be in communication with a second client application 712. In various embodiments, one or more of client applications 711, 712 can receive account information in the defined structure from mobile device application 720. In alternative various embodiments, one or more of client applications 711, 712 can receive account information in a structure other than the defined structure. In this situation, mobile device application 720 can use an internal structure, in addition to the communicated structure. For example, the account information in the accessory device format received at mobile device SDK 721 can be reformatted into the internal structure. The internal structure can then be converted by mobile device SDK 721 into one of multiple "defined" mobile device structures for transmitting to first client application 711 and/or second client application 712. The selection of which of the multiple defined mobile device structures can be based on the client application's desired variables or data structure. Accordingly, in various embodiments, mobile device SDK 721 can further comprise a first client conversion module 722 and a second client conversion module 723, First client conversion module 722 can be configured to convert the account information from the internal structure to a first client application structure. Similarly, second client conversion module 723 can be configured to convert the account information from the internal structure to a second client application structure.

Figure 8:
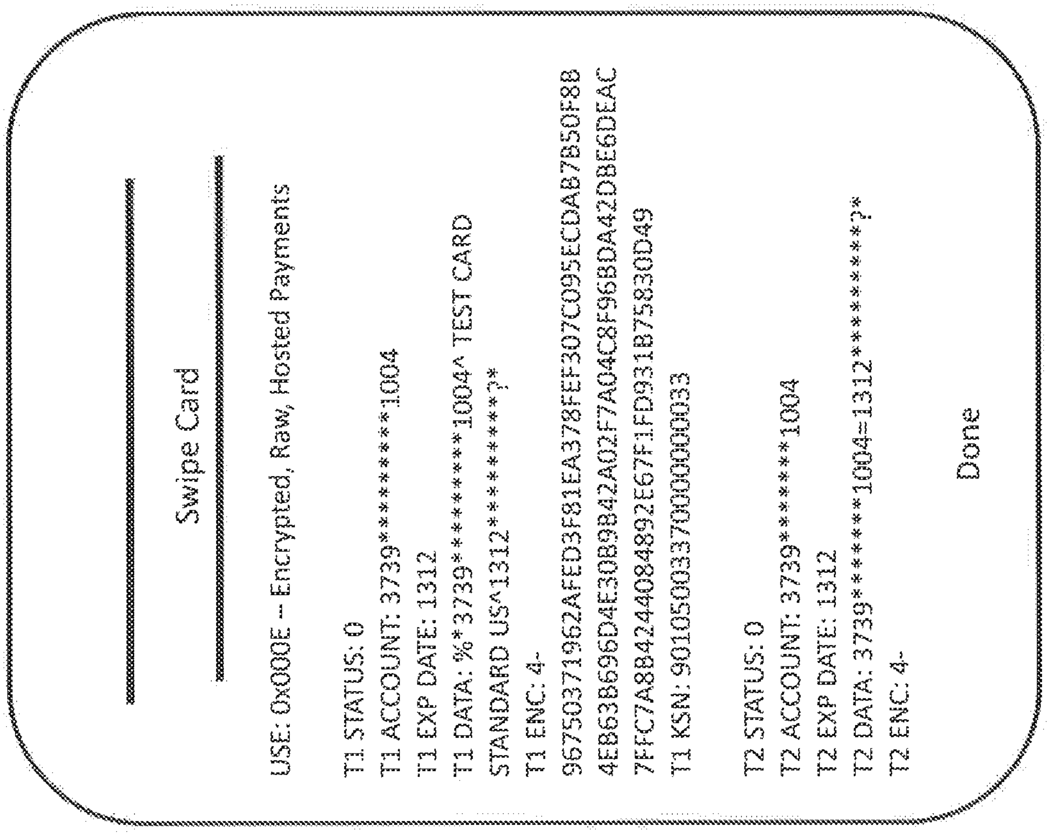
FIG. 8 illustrates a screen shot of account information displayed on a mobile device, in accordance with various embodiments.

In accordance with various embodiments, the account information can be string data, such as name, expiration date, and/or account number. FIG. 8 illustrates an exemplary screenshot of account information obtained from a transaction card swipe at an accessory device. The data can be raw data, masked data, encrypted data, tokenized data, or clear data. Further, the data can be different combinations of raw data, masked data, encrypted data, tokenized data, or clear data, in whole or in part. In various embodiments, account information that is received at the mobile device SDK as masked data, encrypted data, or tokenized data can be communicated to the client application in the same form. In other words, the mobile device SDK can transmit the account data without decrypting or unmasking the data. In other various embodiments, the mobile device application can include additional logic regarding whether to encrypt/mask/tokenize account information that is unencrypted when received.

In addition to the account information received from the accessory device, the mobile device SDK or the mobile device application can also receive the data from the mobile device itself. In accordance with various embodiments, the mobile device can be used to capture additional authentication information. For example, the mobile device can be configured to capture a signature capture, a biometric reader, or an EMV chip in the transaction card or transaction device. In various embodiments, the additional authentication information can be captured by the accessory device, a second accessory device, or the mobile device. The additional authentication information can be sent to the client application as part of the authorization process of the transaction.

In accordance with various embodiments, the mobile device can run a web application or webpage, which can connect to the mobile device SDK for facilitating a transaction. There are different variations of the system. In a first embodiment, a user may be on a webpage on the mobile device and desires to make a purchase on the mobile webpage. Instead of entering the account information into the mobile webpage by typing or pulling the information from a saved file, the mobile device can be aware that the mobile device SDK is installed along with an accessory device. The mobile device may prompt the user to provide a transaction device at the accessory device, so that the mobile device SDK can receive and then upload the account information to the mobile webpage. The mobile webpage can then processes the transaction using business as usual standards.

In a second embodiment, the user may be on a webpage on the mobile device and desires to make a purchase on the mobile webpage. The transaction can be processed through the mobile device SDK rather than through the webpage.

Figure 9:
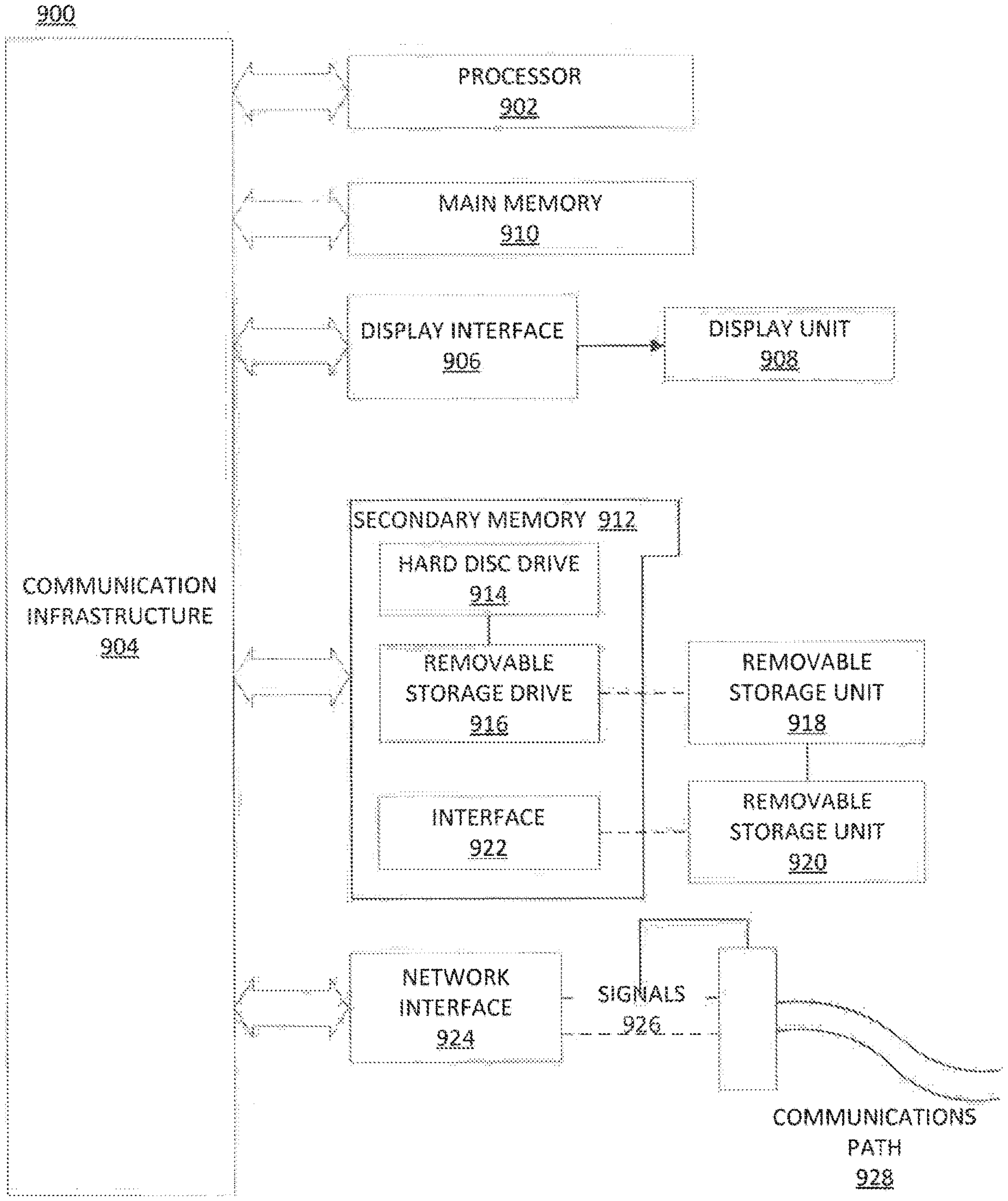
FIG. 9 illustrates a block diagram of a computer system for implementing the present disclosure, in accordance with various embodiments.

In accordance with various embodiments, the present disclosure is directed towards one or more computer systems capable of carrying out the functionality described herein. An example of the computer systems includes a computer system 900, which is shown in FIG. 9.

The computer system 900 includes at least one processor, such as a processor 902. Processor 902 is connected to a communication infrastructure 904, for example, a communications bus, a cross over bar, a network, and the like. Various software embodiments are described in terms of this exemplary computer system 900. After reading this description, it will become apparent to a person skilled in the relevant art(s) how to implement the present disclosure using other computer systems and/or architectures.

The computer system 900 includes a display interface 906 that forwards graphics, text, and other data from the communication infrastructure 904 (or from a frame buffer which is not shown in FIG. 9) for display on a display unit 908.

The computer system 900 further includes a main memory 910, such as random access memory (RAM), and may also include a secondary memory 912. The secondary memory 912 may further include, for example, a hard disk drive 914 and/or a removable storage drive 916, representing a USB drive, a magnetic tape drive, an optical disk drive, etc. The removable storage drive 916 reads from and/or writes to a removable storage unit 918 in a well-known manner. The removable storage unit 918 may represent a USB stick, magnetic tape or an optical disk, and may be read by and written on by the removable storage drive 916. As will be appreciated, the removable storage unit 918 includes a computer usable storage medium having stored therein, computer software and/or data.

In accordance with various embodiments of the present disclosure, the secondary memory 912 may include other similar devices for allowing computer programs or other instructions to be loaded into the computer system 900. Such devices may include, for example, a removable storage unit 920, and an interface 922. Examples of such devices may include a program cartridge and cartridge interface (such as that found in video game devices), a removable memory chip (such as an erasable programmable read only memory (EPROM), or programmable read only memory (PROM)) and associated socket, and other removable storage units 920 and interfaces 922, which allow software and data to be transferred from the removable storage unit 920 to the computer system 900.

The computer system 900 may further include a communication interface 924. The communication interface 924 allows software and data to be transferred between the computer system 900 and external devices. Examples of the communication interface 924 include, but may not be limited to a modern, a network interface (such as an Ethernet card), a communications port, a Personal Computer Memory Card International Association (PCMCIA) slot and card, and the like. Software and data transferred via the communication interface 924 are in the form of a plurality of signals, hereinafter referred to as signals 926, which may be electronic, electromagnetic, optical or other signals capable of being received by the communication interface 924. The signals 926 are provided to the communication interface 924 via a communication path (e.g., channel) 928. The communication path 928 carries the signals 926 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 916, a hard disk installed in hard disk drive 914, the signals 926, and the like. These computer program products provide software to the computer system 900. The present disclosure is directed to such computer program products.

Computer programs (also referred to as computer control logic) are stored in the main memory 910 and/or the secondary memory 912. Computer programs may also be received via the communication interface 904. Such computer programs, when executed, enable the computer system 900 to perform the features of the present disclosure, as discussed herein In particular, the computer programs, when executed, enable the processor 902 to perform the features of the present disclosure. Accordingly, such computer programs represent controllers of the computer system 900.

In various embodiments, where the present disclosure is implemented using a software, the software may be stored in a computer program product and loaded into the computer system 900 using the removable storage drive 916, the hard disk drive 914 or the communication interface 924. The control logic (software), when executed by the processor 902, causes the processor 902 to perform the functions of the present disclosure as described herein.

In various embodiments, the present disclosure is implemented primarily in hardware using, for example, hardware components such as application specific integrated circuits (ASIC). Implementation of the hardware state machine so as to perform the functions described herein will be apparent to persons skilled in the relevant art(s).

In yet another embodiment, the present disclosure is implemented using a combination of both the hardware and the software.

The various embodiments of the present disclosure have been described above, it should be understood that they have been presented by way of example, and not limitation. It will be apparent to persons skilled in the relevant art(s) that various changes in form and detail can be made therein without departing from the spirit and scope of the present disclosure. Thus, the present disclosure should not be limited by any of the above described exemplary embodiments, but should be defined only in accordance with the following claims and their equivalents.

In addition, it should be understood that the figures illustrated in the attachments, which highlight the functionality and advantages of the present disclosure, are presented for example purposes only. The architecture of the present disclosure is sufficiently flexible and configurable, such that it may be utilized (and navigated) in ways other than that shown in the accompanying figures. Systems, methods and computer program products are provided.

In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card or other device is associated with the account. For example, the cardmember may include a transaction account owner, an: transaction account user, an account affiliate, a child account user, a subsidiary account user, a beneficiary of an account, a custodian of an account, and/or any other person or entity affiliated or associated with a transaction account.

As used herein, "match" or similar terms may include an identical match, a partial match, matching a subset of data, a correspondence, an association, an algorithmic relationship and/or the like. Similarly, as used herein, "authenticate" or similar terms may include an exact authentication, a partial authentication, authenticating a subset of data, a correspondence, an association, an algorithmic relationship and/or the like.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTube, AppleTV, Pandora, xBox, Sony Playstation), a uniform resource locator ("URL"), a document (e.g., a Microsoft Word document, a Microsoft Excel document, an Adobe.pdf document, etc.), an "ebook." an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel and/or the may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, foursquare@, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones. In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, IMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like, A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 900 may be implemented as micro-applications or micro-apps. Micro-apps are typically deployed in the context of a mobile operating system, including for example, a Palm mobile operating system, a Windows mobile operating system, an Android Operating System, Apple IOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-

145.pdf (last visited June 2012), which is hereby incorporated by reference in its entirety.

Any databases discussed herein may include relational, hierarchical, graphical, or object-oriented structure and/or any other database configurations. Common database products that may be used to implement the databases include DB2 by IBM (Armonk, NY), various database products available from Oracle Corporation (Redwood Shores, CA), Microsoft Access or Microsoft SQL Server by Microsoft Corporation (Redmond, Washington), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Phrases and terms similar to an "entity" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account debit account, prepaid account, telephone card, embossed card, smart card, magnetic stripe card, bar code card, transponder, radio frequency card or an associated account.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Phrases and terms similar to "merchant," "supplier" or "seller" may include any entity that receives payment or other consideration. For example, a supplier may request payment for goods sold to a buyer who holds an account with a transaction account issuer.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-implemented method for converting mobile device transaction data, the method comprising:
- operating, by a mobile device, a first client application installed on the mobile device, the first client application operating using a first application-specific data structure particular to the first client application;
- operating, by the mobile device, a second client application installed on the mobile device, the second client application operating using a second application-specific data structure particular to the second client application;
- detecting, by the mobile device, an accessory device event of an accessory device;
- receiving, by the mobile device, device connect information of the accessory device;
- receiving, by the mobile device, transaction data from the accessory device in an accessory device format of the accessory device; and
- converting, by the mobile device, the transaction data to either the first application-specific data structure for use by the first client application or the second application-specific data structure for use by the second client application based on the accessory device format of the accessory device.

2. The computer-implemented method of claim 1, wherein the first application-specific data structure buffers the first client application from software or format changes of the accessory device.

3. The computer-implemented method of claim 1, wherein the second application-specific data structure buffers the second client application from software or format changes of the accessory device.

4. The computer-implemented method of claim 1, wherein the second application-specific data structure is different from the first application-specific data structure.

5. The computer-implemented method of claim 1, further comprising:
- providing, by the mobile device, the transaction data in the first application-specific data structure to the first client application.

6. The computer-implemented method of claim 1, further comprising:
- providing, by the mobile device, the transaction data in the second application-specific data structure to the second client application.

7. The computer-implemented method of claim 1, wherein the transaction data is non-application-specific.

8. A system for converting mobile device transaction data, the system comprising:

one or more processors; and one or more data storage devices comprising instructions which, when executed by the one or more processors, cause the one or more processors to perform operations comprising:

operating, by a mobile device, a first client application installed on the mobile device, the first client application operating using a first application-specific data structure particular to the first client application;

operating, by the mobile device, a second client application installed on the mobile device, the second client application operating using a second application-specific data structure particular to the second client application;

detecting, by the mobile device, an accessory device event of an accessory device;

receiving, by the mobile device, device connect information of the accessory device;

receiving, by the mobile device, transaction data from the accessory device in an accessory device format of the accessory device; and converting, by the mobile device, the transaction data to either the first application-specific data structure for use by the first client application or the second application-specific data structure for use by the second client application based on the accessory device format of the accessory device.

9. The system of claim 8, wherein the first application-specific data structure buffers the first client application from software or format changes of the accessory device.

10. The system of claim 8, wherein the second application-specific data structure buffers the second client application from software or format changes of the accessory device.

11. The system of claim 8, wherein the second application-specific data structure is different from the first application-specific data structure.

12. The system of claim 8, the operations further comprising:

providing, by the mobile device, the transaction data in the first application-specific data structure to the first client application.

13. The system of claim 8, the operations further comprising:

providing, by the mobile device, the transaction data in the second application-specific data structure to the second client application.

14. The system of claim 8, wherein the transaction data is non-application-specific.

15. A non-transitory computer-readable medium comprising instructions which, when executed by one or more processors, cause the one or more processors to perform a method for converting mobile device transaction data, the method comprising:

operating, by a mobile device, a first client application installed on the mobile device, the first client application operating using a first application-specific data structure particular to the first client application;

operating, by the mobile device, a second client application installed on the mobile device, the second client application operating using a second application-specific data structure particular to the second client application;

detecting, by the mobile device, an accessory device event of an accessory device;

receiving, by the mobile device, device connect information of the accessory device;

receiving, by the mobile device, transaction data from the accessory device in an accessory device format of the accessory device; and converting, by the mobile device, the transaction data to either the first application-specific data structure for use by the first client application or the second application-specific data structure for use by the second client application based on the accessory device format of the accessory device.

16. The non-transitory computer-readable medium of claim 15, wherein the first application-specific data structure buffers the first client application from software or format changes of the accessory device.

17. The non-transitory computer-readable medium of claim 15, wherein the second application-specific data structure buffers the second client application from software or format changes of the accessory device.

18. The non-transitory computer-readable medium of claim 15, wherein the second application-specific data structure is different from the first application-specific data structure.

19. The non-transitory computer-readable medium of claim 15, the method further comprising:

providing, by the mobile device, the transaction data in the first application-specific data structure to the first client application.

20. The non-transitory computer-readable medium of claim 15, the method further comprising:

providing, by the mobile device, the transaction data in the second application-specific data structure to the second client application.

* * * * *